(12) United States Patent
Douglass et al.

(10) Patent No.: US 10,749,333 B2
(45) Date of Patent: Aug. 18, 2020

(54) THERMAL LIMITER FUSE SYSTEM FOR ELECTRIC MOTOR PROTECTION

(71) Applicant: EATON INTELLIGENT POWER LIMITED, Dublin, OT (IE)

(72) Inventors: Robert Stephen Douglass, Wildwood, MO (US); Kelly Ruth Austin, Brandon, MS (US); Anil Pursottom Bhansali, Madison, MS (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/865,697

(22) Filed: Jan. 9, 2018

(65) Prior Publication Data

US 2019/0214810 A1    Jul. 11, 2019

(51) Int. Cl.
| | |
|---|---|
| *H02H 7/085* | (2006.01) |
| *H01H 37/04* | (2006.01) |
| *H02K 11/25* | (2016.01) |
| *H02P 29/024* | (2016.01) |
| *H02P 3/06* | (2006.01) |
| *H01H 37/76* | (2006.01) |

(52) U.S. Cl.
CPC ........ *H02H 7/0852* (2013.01); *H01H 37/043* (2013.01); *H01H 37/761* (2013.01); *H02K 11/25* (2016.01); *H02P 3/06* (2013.01); *H02P 29/024* (2013.01); *H01H 2037/762* (2013.01)

(58) Field of Classification Search
CPC ....... H02H 7/0852; H02P 3/06; H02P 29/024; H01H 37/043; H01H 2037/762; H01H 85/143; H01H 85/36; H01H 85/0026; H01H 85/0456; H01H 85/153; H01H 85/203; H01H 85/2025; H02K 11/25

USPC ......................................... 337/180, 231, 232
See application file for complete search history.

(56) References Cited

U.S. PATENT DOCUMENTS

| | | | | | |
|---|---|---|---|---|---|
| 4,127,839 | A | * | 11/1978 | Ito ........................ | H01H 37/764 337/408 |
| 4,189,697 | A | * | 2/1980 | Hara .................... | H01H 37/765 337/407 |
| 4,210,893 | A | * | 7/1980 | Hara ...................... | H01H 29/18 337/407 |
| 4,292,617 | A | * | 9/1981 | McVey ................ | H01H 37/765 337/407 |

(Continued)

FOREIGN PATENT DOCUMENTS

| | | |
|---|---|---|
| JP | S57121120 A | 7/1982 |
| JP | H0414927 A | 1/1992 |
| JP | H0660948 A | 3/1994 |

OTHER PUBLICATIONS

Extended European Search Report regarding European Patent Application 19150859.7-1024 dated Jun. 3, 2019; pp. 1-9.

*Primary Examiner* — Jayprakash N Gandhi
*Assistant Examiner* — Stephen S Sul
(74) *Attorney, Agent, or Firm* — Armstrong Teasdale LLP

(57) ABSTRACT

A thermal limiter system for an electric motor includes a thermal limiter fuse having a hollow contact element anchored by solder to at least one of first and second terminals of the fuse. A coaxial spring element causes the hollow contact element to slidably release and separate from one of the first and second terminals due to overheating of the solder that is not caused by a flow of electrical current. The system also includes stator mounting blocks and a stator cooling jacket for a motor to be thermally protected.

20 Claims, 10 Drawing Sheets

(56) References Cited

U.S. PATENT DOCUMENTS

| | | | | |
|---|---|---|---|---|
| 4,384,267 | A * | 5/1983 | Aoki | H01H 37/765 337/407 |
| 4,532,489 | A * | 7/1985 | Phillips | H01H 85/0411 29/623 |
| 6,008,555 | A * | 12/1999 | Garr | H02K 11/25 310/260 |
| 6,376,947 | B1 * | 4/2002 | Tateishi | H01H 11/06 200/11 G |
| 8,129,648 | B2 * | 3/2012 | Zimmermann | H01T 1/14 218/158 |
| 8,454,390 | B2 * | 6/2013 | Darr | H01R 13/68 439/620.28 |
| 2005/0179516 | A1 * | 8/2005 | Yoshikawa | H01H 37/765 337/401 |
| 2006/0232372 | A1 * | 10/2006 | Yoshikawa | H01H 37/767 337/401 |
| 2006/0284721 | A1 * | 12/2006 | Jakobsen | H01H 11/0006 337/187 |
| 2014/0035716 | A1 * | 2/2014 | Doblack | H01H 85/36 337/148 |
| 2014/0253280 | A1 * | 9/2014 | Kim | H01H 85/36 337/139 |
| 2016/0329773 | A1 * | 11/2016 | Nakayama | H01R 4/182 |
| 2016/0336136 | A1 * | 11/2016 | Kim | H01H 37/765 |
| 2017/0345603 | A1 * | 11/2017 | Yoon | H01H 85/06 |

* cited by examiner

THERMAL LIMITER FUSE SYSTEM FOR ELECTRIC MOTOR PROTECTION

BACKGROUND OF THE INVENTION

The field of the invention relates generally to thermal limiter devices, and more specifically to a thermal limiter fuse system for thermally protecting a multi-phase electric motor application in a loss of phase condition.

Electric motors operating in severe thermal duty conditions present certain challenges from a circuit protection perspective. For example, electric motor drives for hydraulic pumps in aerospace applications are designed to operate in severe thermal duty conditions. Circuit protection devices for protecting the motor drives such as overcurrent protection fuses and circuit breakers are likewise designed to withstand severe thermal duty conditions. Conventional overcurrent protection are designed primarily to respond to overcurrent fault conditions (e.g., short circuit or overload conditions) and work quite well to protect the motor in this regard, but problematic operating conditions of motor drives may arise that do not involve overcurrent conditions that trigger operation of overcurrent protection devices, and conventional overcurrent protection devices therefor are incapable of addressing them.

Specifically for multi-phase electric motors, if one of the power phases supplied to the motor is lost while the motor is operating, the motor may continue to operate but is subject to overheating. If not accompanied by an overcurrent condition, overcurrent protection devices will not respond to open the circuit and interrupt the motor. Coupled with severe thermal duty conditions, unacceptable fire hazards may result. A thermal protection device and system that is responsive to a loss of phase condition in a multi-phase electrical motor application and in the absence of an overcurrent condition is accordingly desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Thermal limiting fuses and thermal protection systems including thermal limiting fuses are described herein that reliably respond to the thermal influence of a loss of phase condition in a multi-phase electric motor application that is subject to severe thermal duty conditions in use. Specifically, thermal limiting fuses are described that are responsive to a thermal condition associated with stator winding overheating in the motor, as opposed to direct heating from the motor load current itself as in a typical overcurrent protection fuse. As such, the thermal limiting fuses reliably respond to and interrupt actual problematic stator winding heating conditions caused by a loss of phase condition otherwise unaccompanied by fault overcurrent conditions for which convention overcurrent protection fuses are not responsive.

The thermal limiting fuses and thermal protection systems provide particular benefits in the case of electric motor driven hydraulic pump applications in an aerospace application by avoiding possible fire hazard conditions attributable to loss of phase conditions as well as motor stalling. The benefits of the inventive concepts described herein apply equally, however, to other applications wherein thermal issues are of concern that are unaccompanied by overcurrent fault conditions. The following description of thermal protection systems for aerospace applications of an electric motor is therefore set forth for the sake of illustration rather than limitation. Method aspects will be in part apparent and in part explicitly discussed in the following description.

Figure 1:
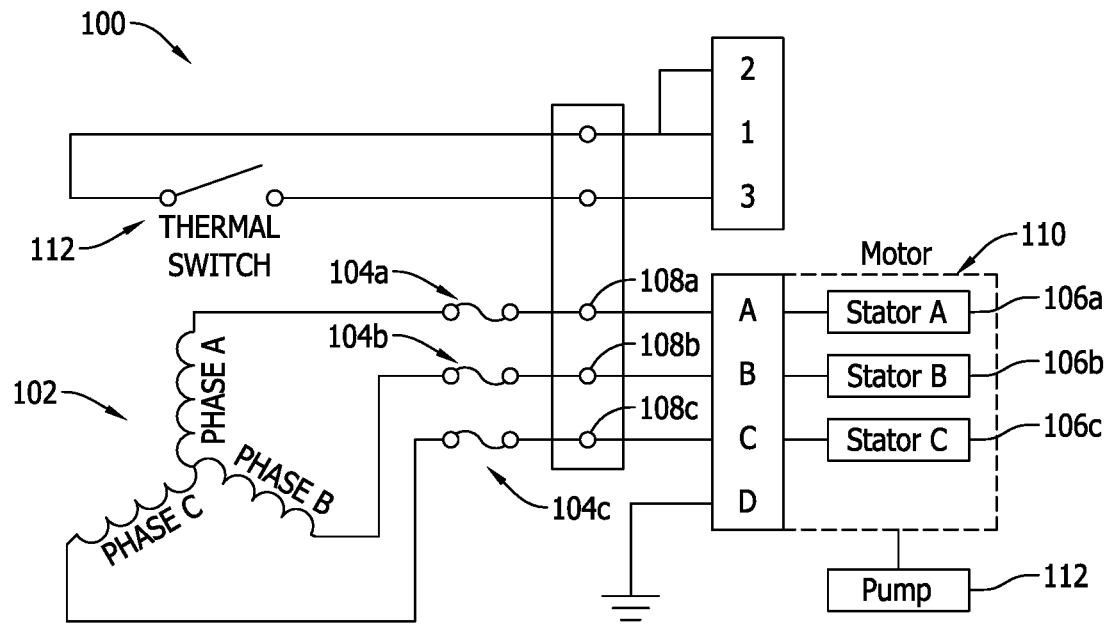
FIG. 1 is a circuit schematic of an exemplary thermal limiter system in accordance with an exemplary embodiment of the present invention.

FIG. 1 is a circuit schematic of an exemplary thermal limiter system 100 in accordance with an exemplary embodiment of the present invention. The thermal limiter system 100 as shown includes a three-phase power supply 102 including respective phases shown as Phase A, Phase B, and Phase C. Thermal limiter fuses 104a, 104b and 104c are respectively connected to each of the Phase A, Phase B and Phase C. Each of the thermal limiter fuses 104a, 104b and 104c are in turn respectively connected to motor windings shown as stator A, stator B and stator C (also indicated as 106a, 106b and 106c) through respective terminals A, B and C (also indicated as 108a, 108b and 108c) of a three-phase electric motor 110. As is well known, the stator windings 106a, 106b and 106c in combination define a stator that is assembled with a rotor (not shown) in the motor 110. The stators windings 106a, 106b and 106c are stationary elements that cause a rotation of the rotor at a controllable speed when the stator windings are energized according to well-known electromagnetic principles and controls.

In a contemplated embodiment, the motor 110 serves as a drive for a hydraulic pump 112 in an aerospace application that is subject to severe thermal duty cycles. In view of the severe duty cycles in the operating environment, the thermal limiter system 100 includes a thermal switch 114 that is operative to connect, disconnect and protect the motor 110 and/or other connected equipment when thermal conditions exceed a predetermined threshold or threshold. Such thermal switches are well-known and further description thereof is omitted.

In normal use, and in conventional systems of this type, the thermal switch 114 provides thermal protection and conventional overcurrent protection devices provide circuit protection for the circuitry including the motor 110. An abnormal operating condition is possible, however, wherein one of Phase A, Phase B and Phase C of the power supply 102 is lost to the motor 110 while the others phases continue to power the motor such that the motor 110 continues to operate with less than all the stator windings 106a, 106b and 106c energized. This can cause overheating of the motor 110 generally, and specifically overheating of the remaining stator windings.

Bearing in mind the severe thermal duty cycle that the motor is designed to withstand, overheating of the motor 110 is not easily detected or prevented by the thermal switch 114 or typical overcurrent protection devices. In the absence of an external thermal condition sufficient to cause the thermal switch 114 to open, the thermal switch 114 will not open and the motor 110 will continue to operate in a loss of phase condition and accordingly will continue to overheat. At least in some instances, typical overcurrent protection devices such as fuses and circuit breakers will generally not respond to thermal conditions associated with a loss of phase condition unless they are accompanied by fault overcurrent conditions, and the motor 110 will continue to operate in a loss of phase condition and accordingly will continue to overheat. If motor overheating occurs in tandem with high ambient temperature conditions, fire hazards may result. Otherwise, motor stall conditions may be realized that will render the hydraulic pump and associated hydraulic actuators inoperable.

Accordingly, and unlike conventional fuses and overcurrent protection elements including a fusible element that operates to structurally fail and open a circuit path due to Joule heating of the fusible element when predetermined overcurrents flow through the circuit protector, the thermal limiter fuses 104a, 104b and 104c are operative to respond to thermal conditions and heating that are not caused by overcurrent conditions. The thermal limiter fuses 104a, 104b and 104c are therefore sensitive to thermal heating of a connected stator winding to interrupt a problematic loss of phase condition in the absence of an actual overcurrent condition. The thermal limiter fuses 104a, 104b and 104c are independently operable from the thermal switch 114 to disconnect the motor in view of problematic overheating internal to the motor itself (as opposed to thermal conditions of the ambient environment), and therefore provide enhanced thermal protection capability for severe thermal duty cycle applications.

Figure 2:
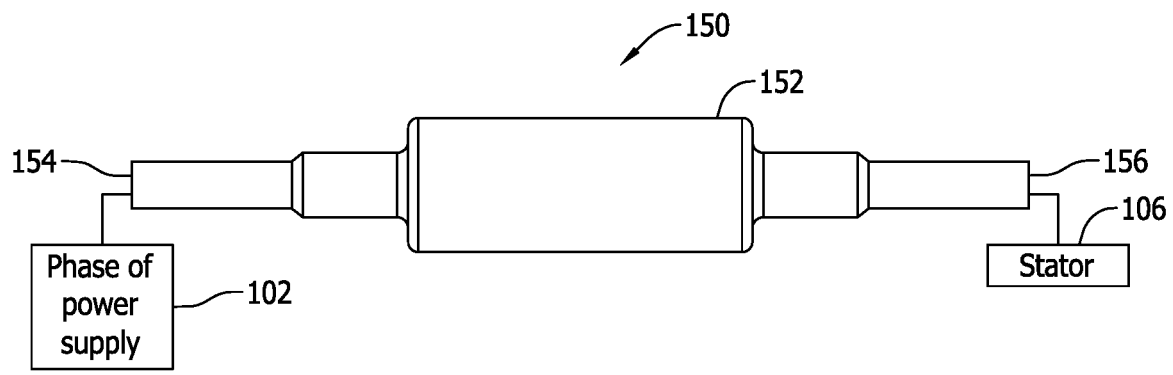
FIG. 2 is a top elevational view of a first exemplary embodiment of a thermal limiter fuse for the system shown in FIG. 1.

FIG. 2 is a top elevational view of a first exemplary embodiment of a thermal limiter fuse 150 that may serve as one of the thermal limiter fuses 104a, 104b and 104c in the thermal limiter system 100 (FIG. 1). In FIG. 2, the thermal limiter fuse 150 is shown with a heat shrink sealing material 152 over the thermal limiter fuse 150 and respective connection wires 154, 156 of one phase of the power supply 102 and one of the stator windings 106. The thermal limiter fuse 150 shown is configured as an in-line protective device, although it may alternatively be provided in other forms including alternative connections and terminals, including but not necessarily limited to blade terminals such as those described further below or other types of connecting terminals known in the art. The heat shrink sealing material 152 may be considered optional in some applications and may be omitted.

Figure 3:
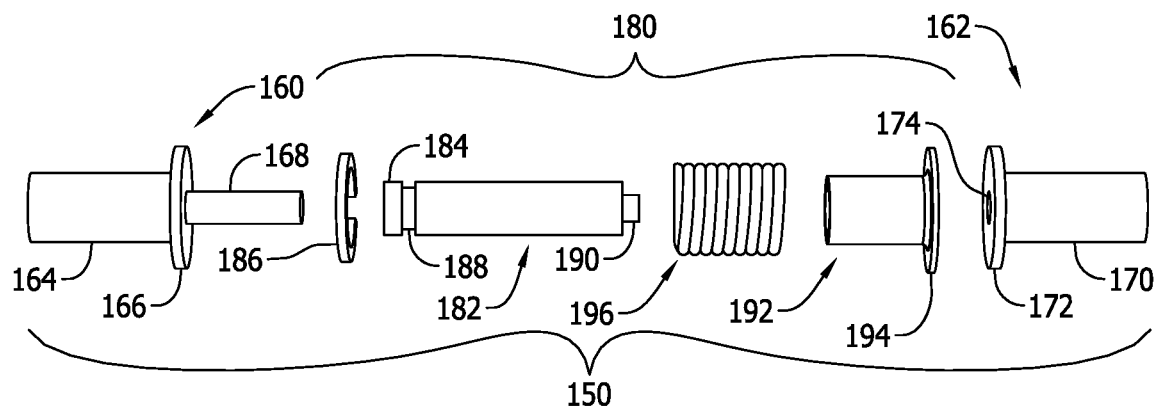
FIG. 3 is an exploded view of internal components of the thermal limiter fuse shown in FIG. 2.

FIG. 3 illustrates internal components of the thermal limiter fuse 150 in exploded view including a first terminal 160 and a second terminal 162 opposing the first terminal 160.

The first terminal 160 includes a wire crimp portion 164, a mounting collar portion 166, and a guide rod portion 168 each integrally formed and fabricated from a conductive material. The wire crimp portion 164, the mounting collar 166 and the guide rod portion 168 are each coaxial cylindrical elements having round outer surfaces of respectively different diameter and axial length. In the illustrated example of FIG. 3, the wire crimp portion 164 has a first diameter and a first axial length measured longitudinally along the thermal limiter fuse 150. The mounting collar 166 has a second diameter larger than the first diameter and a second axial length much shorter than the first axial length. The guide rod portion 168 has a third diameter that is smaller than the first diameter and a second axial length about equal to the first axial length. Variations are of course possible for the portions 164, 166 and 168 of the first terminal 160.

The second terminal 162 includes a wire crimp portion 170 and a mounting collar 172 each integrally formed and fabricated from a conductive material. The wire crimp portion 170 and the mounting collar 172 are each coaxial cylindrical elements having round outer surfaces of respectively different diameter and axial length. In the illustrated example of FIG. 3, the wire crimp portion 170 has a first diameter and a first axial length measured longitudinally along the thermal limiter fuse 150. The mounting collar 172 has a second diameter larger than the first diameter and a second axial length much shorter than the first axial length. Variations are of course possible. The second terminal 162 also includes a guide opening 174 on a distal end of the mounting collar 172.

A thermal limiter assembly 180 is provided between the first terminal 160 and the second terminal 162. The thermal limiter assembly 180 in the example shown includes an elongated cylindrical contact element 182 that is hollow for slidable assembly to the guide rod portion 168 of the first terminal 160 on a first end 184 of the contact element 182. A nonconductive retainer clip 186 couples to the first end 184 via a groove 188 formed in the conductive contact element 182.

A second end 190 of the contact element 182 opposing the first end 184 includes a reduced diameter guide plug that passes through a hollow eyelet 192 and is received in the guide opening 174 on a distal end of the second terminal 162. The eyelet 192 is fabricated from a nonconductive material and includes a mounting collar portion 194 having an increased diameter relative to the remainder of the eyelet 192. A spring element 196 in the form of a coil spring pre-loaded in compression extends over the eyelet 194 and the contact element 182. One end of the spring element 196 contacts the mounting collar portion 194 of the eyelet 192 and the other end of the spring element 196 contacts the retainer clip 186 when the thermal limiter assembly 180 is assembled. It is appreciated that in another embodiment, a tension spring could likewise be utilized if desired with similar effect.

Figure 4:
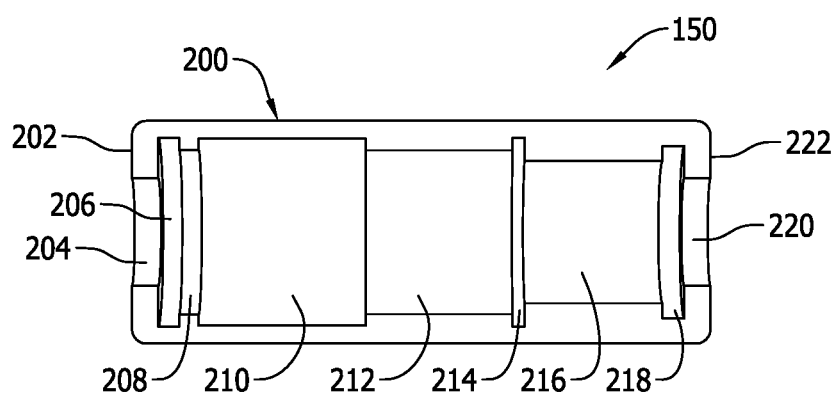
FIG. 4 illustrates an exemplary housing piece for the thermal limiter fuse shown in FIG. 2.

FIG. 4 illustrates an exemplary housing piece 200 for the thermal limiter fuse 150. The housing piece 200 is fabricated from a nonconductive material such as plastic into a round semi-cylinder having a smooth outer cylindrical surface and an interior surface as shown including a series of semi-cylindrical receptacles that respectively facilitate assembly of the thermal limiter assembly 180 and the wire crimp terminals 160, 162 (FIG. 3) as follows.

A first lateral end 202 of the housing piece 200 includes an opening 204 and an opening 206 of internal diameter about equal to the diameters of the wire crimp portion 164 and the mounting collar 166 of the first terminal 160. The opening 204 receives a portion of the wire crimp portion 164 and the opening 206 receives the mounting collar 166 of the first terminal 160. The housing piece 200 includes a reduced diameter opening 208 adjacent the opening 206 such that the first terminal 160 is held stationary to the housing piece 200 as shown in the assembly view of FIG. 5.

Figure 5:
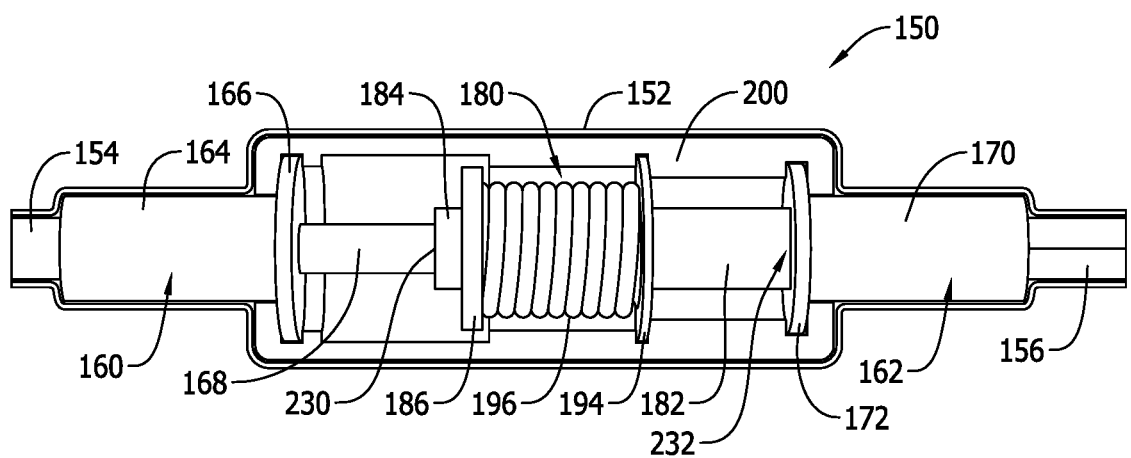
FIG. 5 is a partial perspective view of the thermal limiter fuse shown in FIG. 2 in an unactuated state.

Adjacent the opening 208 in the housing piece 200 is a large actuation opening 210 for the contact element 182 to move to when actuated as explained below. A reduced diameter opening 212 follows the actuation opening 210 and culminates at an increased diameter opening 214 that receives the mounting collar 194 of the eyelet 192 as shown in FIG. 5, holding the eyelet 192 in a stationary position in the housing piece 200. A reduced diameter opening follows the opening 214 such that the mounting collar 194 of the eyelet 192 is held stationary in the housing piece 200.

Following the opening 216 in the housing piece 200 is another increased diameter opening 216 and a reduced diameter opening 220 accessible on a second lateral end 222 of the housing piece. The opening 218 receives the mounting collar 172 of the second terminal 162 such that the second terminal 162 is held stationary to the housing piece 200, and the wire crimp portion 170 of the second terminal 162 extends from the opening 220.

A second housing piece (not shown) that is identical to the housing piece 200 is assembled to the housing piece 200 in a mirror-image arrangement to capture the terminals 160, 162 and the thermal limiter assembly 180 in place between the housing pieces. The housing pieces may be bonded together and the assembly completed by crimping the connecting wires 154 and 156 and applying the heat shrink material 152. The result is shown in FIG. 5 with the thermal limiter assembly 180 in an unactuated state wherein the contact element 182 is soldered in place at a first location 230 and a second location 232 in the thermal limiter assembly 180.

Specifically, and as shown in FIG. 5, at the first location 230 the contact element 182 is soldered to the end of the guide rod portion 168 of the first terminal 160 at the first end 184 of the contact element 182. At the second location 232 the contact element 182 is soldered to the mounting collar 172 of the second terminal 162 at the second end 190 of the contact element 182. An electrical current path is therefore completed though the contact element 182 and the soldered connections at the locations 230, 232 to the respective first and second terminal 160 and 162. The spring element 196 is electrically isolated from the current path and extends coaxially around the contact element 182 and the eyelet 192 that receives the contact element 182. In normal use the force exerted by the spring 196 on the retainer clip 186 is insufficient to overcome the soldered connections of the contact element 182 and the contact element 182 is accordingly held in a stationary position relative to each terminal 160, 162, the eyelet 192 and the housing 200.

While an exemplary rounded semi-cylindrical housing piece 200 has been described, non-cylindrical housing pieces having non-round internal and external profiles may likewise be utilized in other embodiments as desired. As one example, rectangular housing pieces may likewise be provided for assembly around the thermal limiter assembly 100, or a rectangular case and cover may be assembled to one another in manner that encloses the thermal limiter assembly. Numerous variations are possible in this regard.

Figure 6:
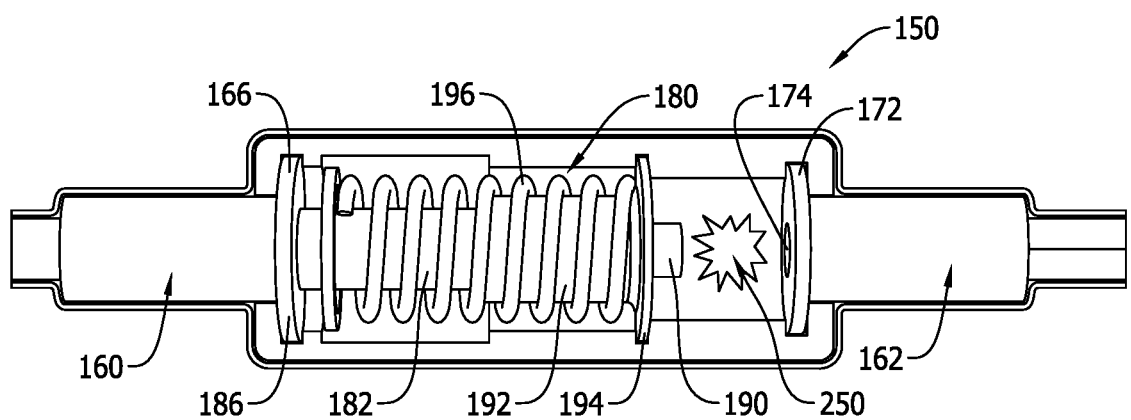
FIG. 6 is a partial perspective view of the thermal limiter fuse shown in FIG. 2 in an actuated state.
Figure 7:
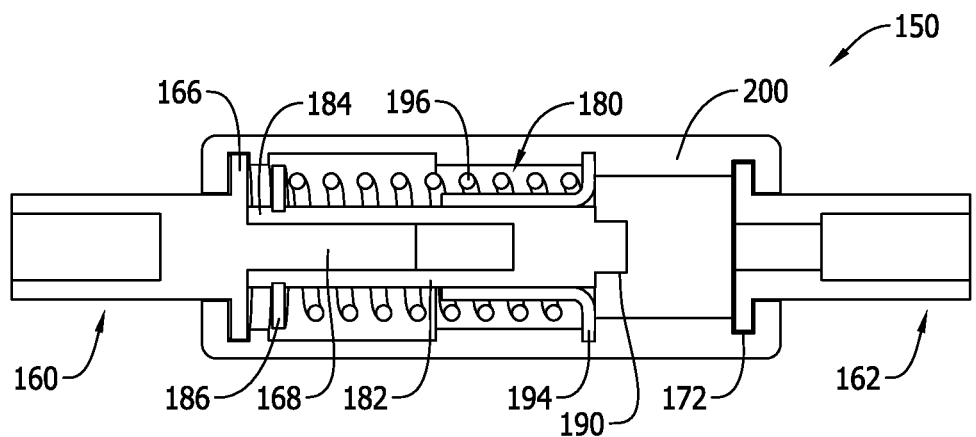
FIG. 7 is another partial perspective view of the thermal limiter fuse shown in the actuated state.

FIG. 6 is a partial perspective view of the thermal limiter fuse 150 in an actuated state. Thermal heating associated with a phase loss condition and heating of an effected stator winding connected to the thermal limiter 150 heats the solder at each end 184, 192 of the contact element 180 at the first and second locations 230, 232 to the point of softening, and eventually the spring force overcomes the strength of the softened solder and the spring 196 pushes the contact element 182 axially toward the first terminal 160 and away from the second terminal 162. As this happens the hollow contact element 182 slides on the guide rod portion 168 (FIG. 5) of the first terminal 160 relative to the housing 200 and the eyelet 192 toward the mounting collar portion 166. As the contact element 182 is displaced by the spring 196, contact element 182 passes through the eyelet 192 and the second end 190 of the contact element 182 becomes separated from the second terminal 162 as shown, creating an open or disconnected circuit between the contact element end 190 and the second terminal 162. Electrical arcing 250 may occur as the circuit is opened. Once arcing 250 is extinguished current flow ceases through the limiter as shown in FIG. 7 to the affected stator winding. The affected stator winding is now disconnected by and through the thermal limiter fuse 140, and the loss of phase condition causing the stator winding to overheat is effectively interrupted.

In a contemplated embodiment, the solder used to establish each connection at the locations 230, 232 is formulated such that the solder reaches a point of softening at approximately 280° F. that is attributable to a loss of phase condition that has heated a stator winding of the motor to a point that is approaching a fire hazard or a motor stalling likelihood. Since the electrical connection in the thermal limiter fuse 150 remains closed up to this point, Joule heating by electrical current flowing through the thermal limiter fuse 150 does occur, but Joule heating is far less than the heating attributable to the loss of phase condition and Joule heating itself is not sufficient to cause the thermal limiter fuse 150 to open. In response to heating attributable to the loss of phase condition, however, the force stored in the coaxial spring element 196 is selected to cause the thermal limiter assembly 180 to actuate once the solder temperature reaches a predetermined temperature such as the aforementioned 280° F. The solder establishing the connections at the locations 230, 232 is accordingly sometimes referred to a 280° F. trigger solder. Such 280° F. trigger solder may additionally cause the thermal limiter assembly 150 to actuate and open at a point prior to motor stalling that would otherwise occur from a continued operation in the loss of phase condition. It is to be understood, however, that solder may be formulated to soften and trigger at temperature thresholds other than 280° F. in other embodiments as desired.

Figure 8:
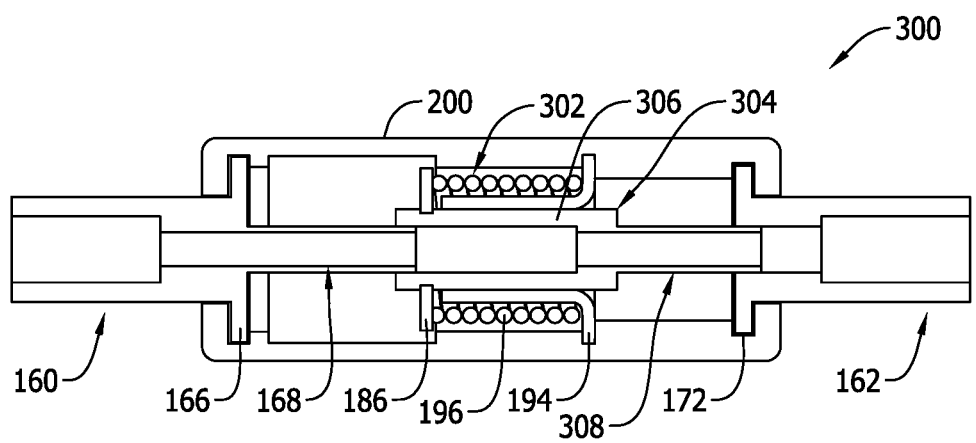
FIG. 8 is a sectional view of a second exemplary embodiment of a thermal limiter fuse for the system shown in FIG. 1 and in an unactuated state.

FIG. 8 is a sectional view of a second exemplary embodiment of a thermal limiter fuse 300 for the thermal limiter system 100 shown in FIG. 1 and in an unactuated state. The thermal limiter fuse 300 includes a thermal limiter assembly 302 that is similar to the thermal limiter assembly 180 described above but having an alternative contact element 304 including a first cylindrical hollow contact portion 306 having a first outer radius and a second cylindrical hollow contact portion 308 having a second outer radius extending from the first contact portion 306. The first cylindrical hollow contact portion 306 is soldered at one end to the guide rod portion 168 of the first terminal 160, and the second cylindrical hollow contact portion 308 is soldered to the second terminal 162 with, for example, the 280° F. trigger solder discussed above. The guide rod portion 168 is also of a reduced radius relative to the thermal limiter fuse 150 described above, and in combination with the contact element 304 a higher resistance current path is realized relative to the thermal limiter fuse 150, imparting different performance characteristics and a different calibration of the trigger mechanism. The benefits of the thermal limiter fuse 300 are otherwise similar.

Figure 9:
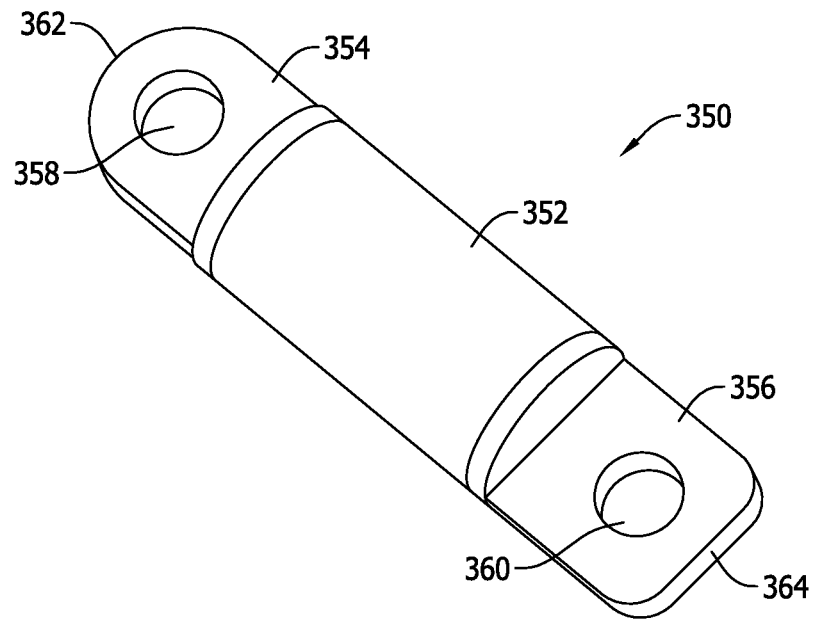
FIG. 9 is a perspective view of a third exemplary embodiment of a thermal limiter fuse for the system shown in FIG. 1.

FIG. 9 is a perspective view of a third exemplary embodiment of a thermal limiter fuse 350 for the thermal limiter system 100 shown in FIG. 1. The thermal limiter fuse 350 includes a cylindrical housing 352, a first blade terminal 354 extending from a first end of the housing 352 and a second blade terminal 356 extending from a second end of the housing 352 opposing the first end and the first blade terminal 354. The first blade terminal 354 includes a first aperture 358 and the second blade terminal 356 includes a second aperture 360. As such the first blade terminal 354 and the second blade terminal 356 may each be connected to line and load side circuitry (e.g., to the power supply and to a stator winding of the motor) via terminal studs extended through each respective aperture 358, 360 and ring terminals of connecting wires.

In the illustrated embodiment, the first blade terminal 354 and the second blade terminal 356 also are differently shaped, with the first blade terminal 354 formed with a uniformly rounded or curved distal end 362 while the second blade terminal 356 is formed with a planar distal end 364 imparting a square profile to the second terminal blade 356. The distinct shapes of the first blade terminal 354 and the second blade terminal 356 in combination with compatible mounting hardware such as the stator mounting blocks described below ensure a connection of the thermal limiter fuse 350 in the most optimal orientation only. As such, the proper polarity of the thermal limiter fuse 350 when connected to the motor can be ensured for reliable operation of the thermal limiter assembly as designed.

Figure 10:
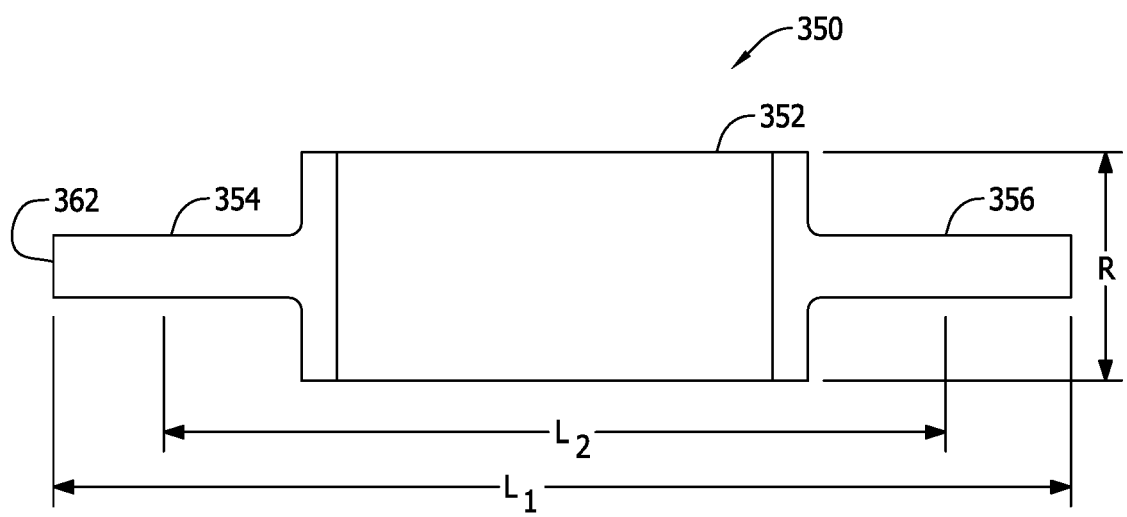
FIG. 10 is a side elevational view of the thermal limiter fuse shown in FIG. 9.

FIG. 10 is a side elevational view of the thermal limiter fuse 350 and illustrating exemplary dimensions thereof. The housing 352 of the thermal limiter fuse 350 in this example has an outer radius R of about 0.410 inches. The overall axial length $L_1$ of the thermal limiter fuse 350 (measured end-to-end from the centerline of the opposing terminal blades 354, 356) is about 1.706 inches. The center-to-center spacing of the apertures 358, 360 of the terminal blades 354, 356 is indicated by $L_2$ and in the example shown $L_2$ is about 1.307 inches. Such dimensions are relatively compact and beneficially facilitate a compact mounting arrangement with an electric motor as described further below. Of course, other dimensions are possible in alternative embodiments.

Figure 11:
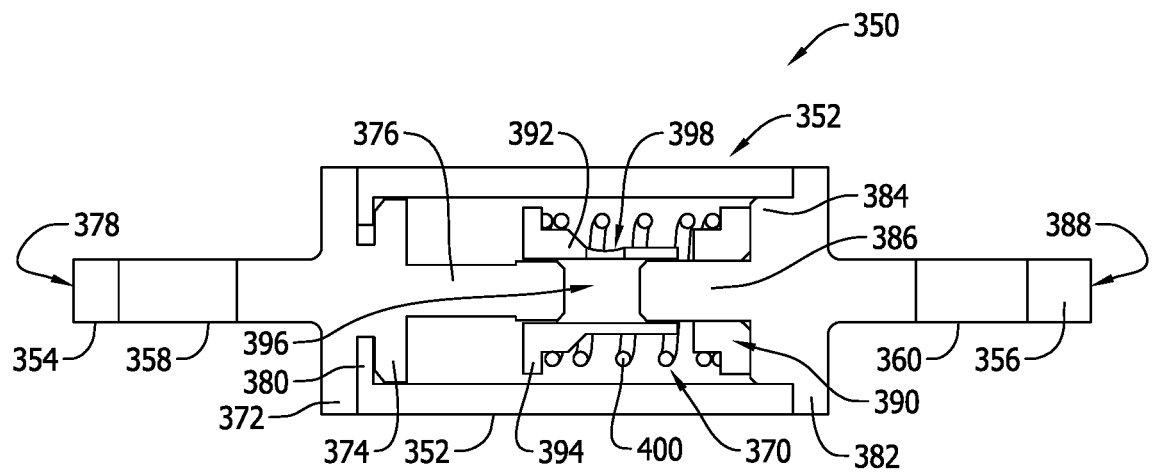
FIG. 11 is a sectional view of the thermal limiter fuse shown in FIG. 10 in an unactuated state.

FIG. 11 is a sectional view of the thermal limiter fuse 350 illustrating internal features thereof including an exemplary thermal limiter assembly 370 an unactuated state. The housing 352 is hollow and is formed with a constant internal diameter and is therefore simpler to fabricate than the relatively complicated shape of the housing piece 200 (FIG. 4).

An end collar portion 372 and a mounting collar portion 374 are integrally formed with the first blade contact 354, and a guide rod portion 376 extends interior to the housing 352 in a coaxial manner with the end collar portion 372 and the mounting collar portion 374. Collectively, the collars 372, 374, the blade contact 354, and the guide rod portion define a first terminal 378 on a first end of the housing 352. The first terminal 378 is held in place in the housing 352 via an end wall 380 of the housing 352 extending between the collar portions 372 and 374.

An end collar portion 382 and a housing mounting portion 384 are integrally formed with the second blade contact 356, and a guide rod portion 386 extends interior to the housing 352 in a coaxial manner with the end collar portion 382 and the mounting collar portion 384. Collectively, the collar portion 382, the mounting portion 384, and the blade contact 356, and the guide rod portion 386 define a second terminal 388 on a second end of the housing 352 opposing the first end and the first terminal 378. The second terminal 378 is bonded to the housing 352 and held in place in a known manner.

The thermal limiter assembly 370 extends between the spaced apart ends of the guide rod portions 376 and 386 of the first and second terminals 378, 388. In the example shown in FIG. 11, the thermal limiter assembly 370 includes a fuse spring seat 390 mounted stationary to the housing mounting portion 384 of the second terminal 388 at the location shown inside the housing 352.

The thermal limiter assembly 370 also includes a hollow contact element 392 and coaxially bridges the space or gap between the ends of the guide rod portions 376 and 386, and the hollow contact element 392 includes a fuse spring seat 394 on one end thereof opposite the fuse spring seat 390 as shown. The hollow contact element 392 is received partly on the first guide rod portion 376 and partly on the second guide rod portion 386 in the unactuated state shown. An interior of the hollow contact element 392 is filled with a trigger solder 396 such as that discussed above, with the solder 396 holding the contact element 392 in place anchored to each of the guide rod portions 376 and 386 at respective locations. The hollow contact element 392 is formed with a solder access opening 398, sometimes referred to as a solder fill opening, through which the trigger solder 396 may be introduced.

A coaxial compression spring 400 completes the thermal limiter assembly 370. The compression spring 400 surrounds the hollow contact element 392 after the trigger solder 396 is applied, and the compression spring 400 extends between the fuse spring seats 390 and 394. The force of the spring 400 is counteracted by the trigger solder 396 in normal operating conditions. That is, in normal use the force exerted by the spring 400 on the contact element 392 is insufficient to overcome the soldered connections of the contact element to the first and second terminals 378, 388 via the trigger solder 396.

Figure 12:
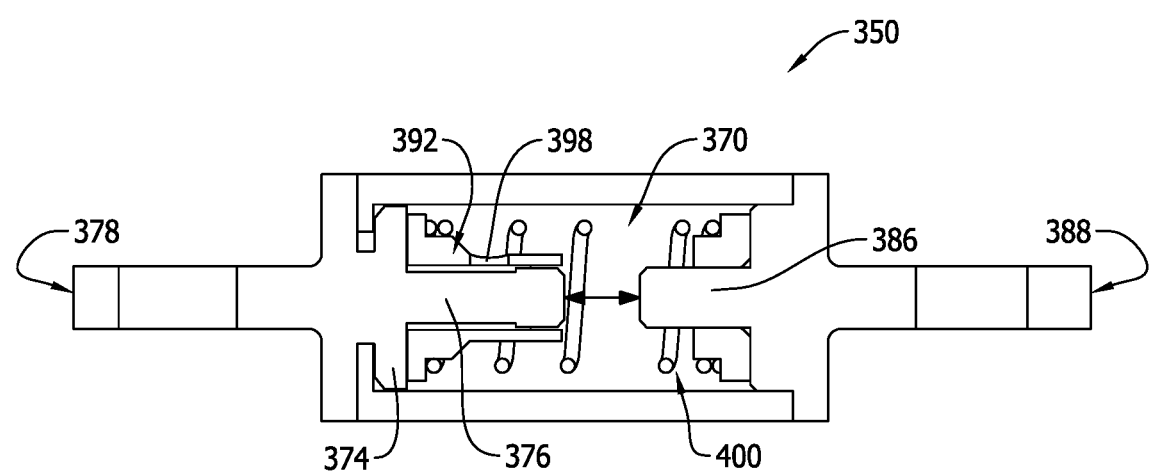
FIG. 12 is a sectional view of the thermal limiter fuse shown in FIG. 10 in an actuated state.

FIG. 12 is a sectional view of the thermal limiter fuse 350 with the thermal limiter assembly 370 in an actuated state. The trigger solder 396 is formulated such that the solder reaches a point of softening at a predetermined temperature (e.g., approximately 280° F.) that is attributable to a loss of phase condition that has heated a stator of the motor to a point that is approaching a fire hazard, plus joule heating by electrical current flowing through the thermal limiter fuse 350. The force stored in the coaxial spring element 400 is selected to cause the thermal limiter assembly 370 to actuate once the solder softens at the predetermined temperature. As this happens, the contact element 392 is displaced by the compression spring 400 and slides along the guide rod portion 376 of the first terminal 378 toward the mounting collar 374 of the first terminal 378 and away from the second terminal 388. As the contact element 392 slides along the guide rod portion 376, the contact element 392 breaks contact with the guide rod portion 386 of the second terminal 388, and an open circuit results between the gapped ends of the guide rod portions 376, 378. In its final actuated state as shown in FIG. 12, the contact element 392 extends entirely on the guide rod portion 376 of the first terminal 378 to open the circuit path between the terminals 378, 388.

The thermal limiter assembly 370 and the trigger solder 396 accordingly interrupts the loss of phase condition that is causing a stator winding to overheat, and also effectively prevents motor stalling that would otherwise occur from a continued operation in the loss of phase condition. The benefits of the thermal limiter fuse 350 are therefore similar to the thermal limiter fuses 150 and 300 described above, but is simpler to manufacture and calibrate for the desired thermal protection.

Figure 13:
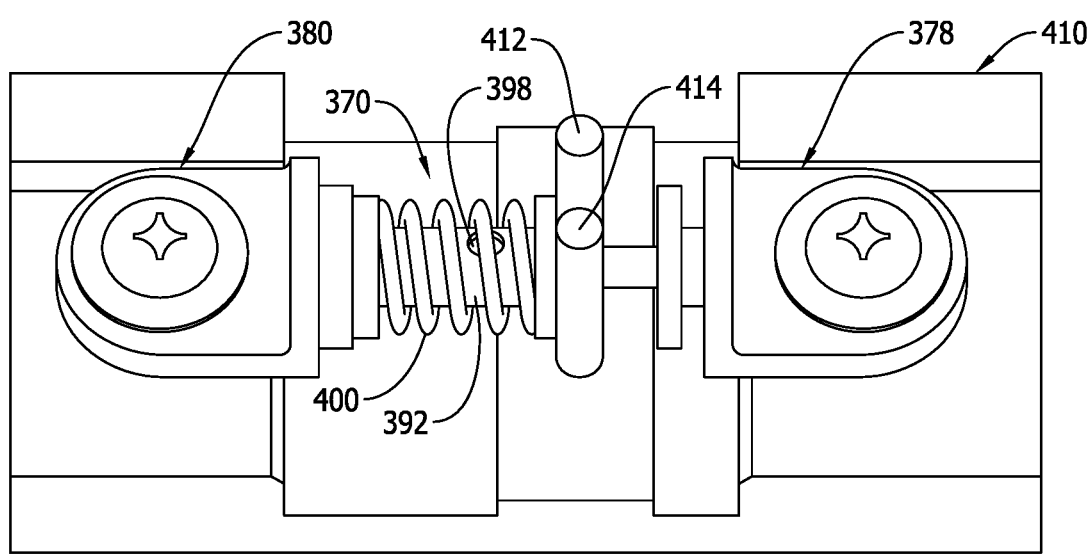
FIG. 13 is an assembly view of the thermal limiter fuse shown in FIG. 10 and illustrating a stage of manufacture thereof.

FIG. 13 is an assembly view of the thermal limiter fuse assembly 370 illustrating a stage of manufacture thereof. The thermal limiter fuse assembly 370 is shown being assembled between the first and second terminals 378, 388 that are fastened to a fixture 410. The fixture 410 includes retainers 412, 414 that hold the thermal limiter fuse assembly 370 in position between the first and second terminals 378, 388 and with the spring 400 loaded with a predetermined amount of force that overcomes the trigger solder connection in a problematic loss of phase operating condition of the motor. The trigger solder 396 (FIG. 11) is introduced via the solder fill opening 398 in the hollow contact element 392 to fill the contact element 392 as described above. Once the trigger solder 396 hardens inside the contact element 392, the thermal limiter fuse 370 and the connected terminals 378, 388 may be removed from the fixture 410 as a unit for final assembly to the housing 352, which may be formed as a two piece housing that is sealed and bonded over the thermal limiter fuse 370 as described above in relation to the thermal limiter fuse 150.

Figure 14:
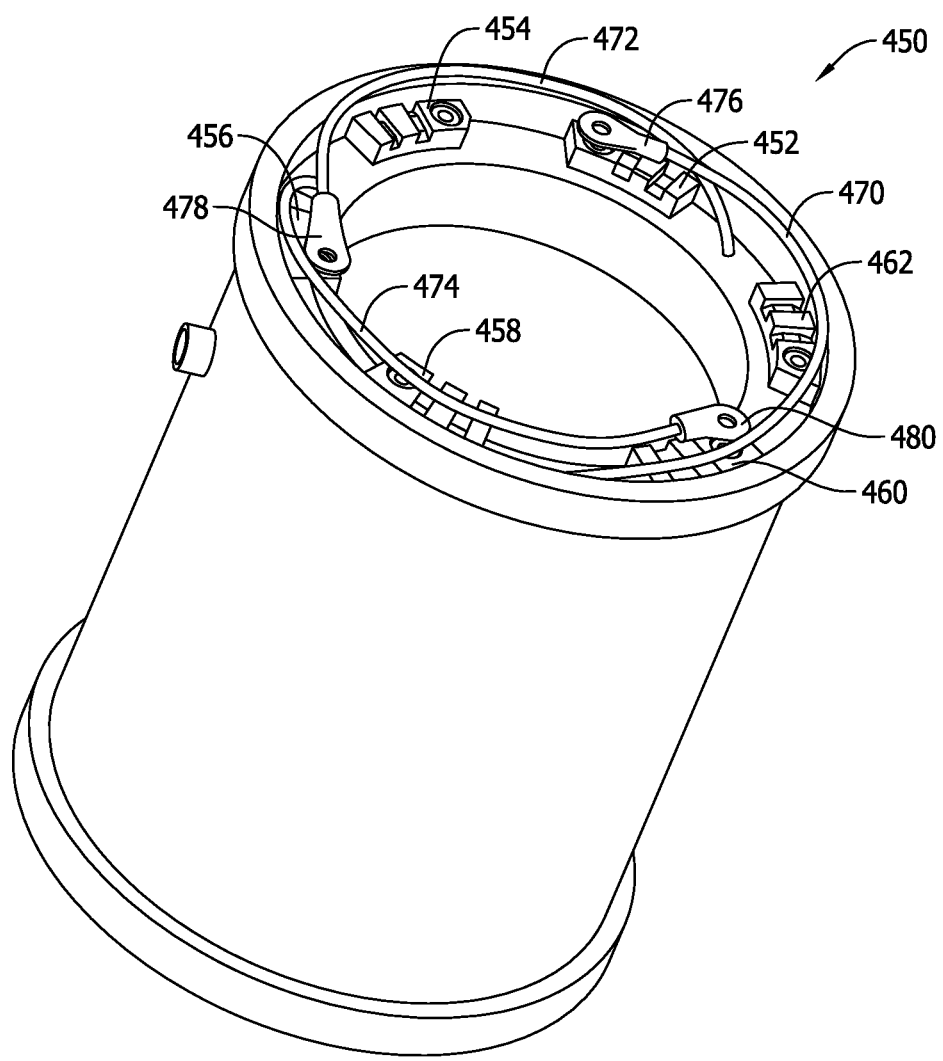
FIG. 14 is a perspective view of an exemplary embodiment of a motor stator cooling jacket with thermal limiter fuses mounted thereto.

FIG. 14 is a perspective view of a stator cooling jacket 450 with thermal limiter fuse mounting blocks 452, 454, 456, 458, 460 and 462 mounted to one end thereof. The blocks 452 and 454 are arranged in spaced apart relation to receive and connect a first thermal limiter fuse 350 (not shown in FIG. 14). The blocks 456 and 458 are arranged in spaced apart relation to receive and connect a second thermal limiter fuse 350 (not shown in FIG. 14). The blocks 460 and 462 are arranged in spaced apart relation to receive and connect a third thermal limiter fuse 350 (not shown in FIG. 14). Stator winding lead wires 470, 472, 474 extend from the end of the stator cooling jacket, and each include respective ring terminal connectors 476, 478, 480 for connection to one of the mounting blocks in each pair and to one of the thermal limiter fuses 350 associated with each pair. Each stator lead wire 470, 472, 474 is connected to one the phases of the motor power supply 102 (e.g., Phase A, Phase B or Phase C) via the other of the mounting blocks in each pair. As such, the stator winding connected to each phase of the power supply is thermally protected by a thermal limiter fuse 350 that interconnects each pair of mounting blocks.

Figure 15:
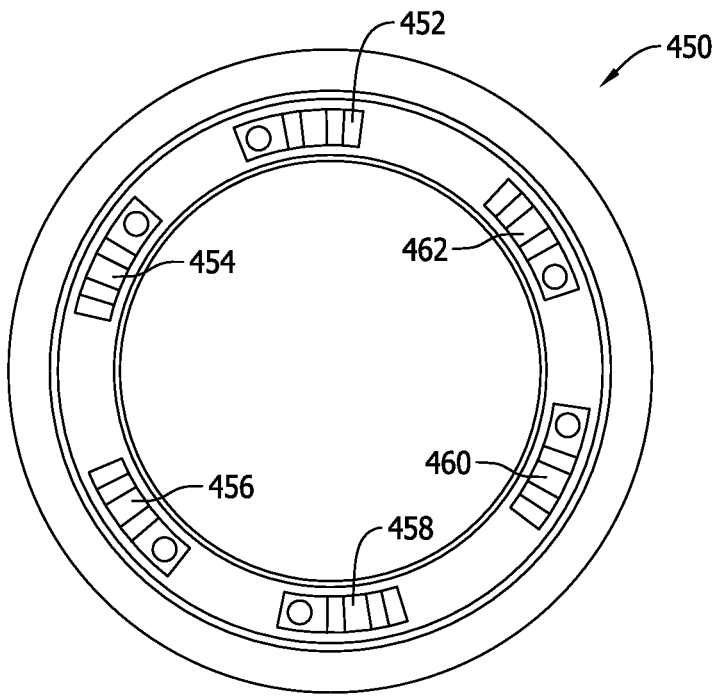
FIG. 15 is a first end view of the stator cooling jacket shown in FIG. 14.

FIG. 15 is a first end view of the stator cooling jacket 450 showing an exemplary angular orientation of the pairs of mounting blocks 452 and 454, 456 and 458, and 460 and 462 extending in spaced relation from one another around the circumference of the cooling jacket end. The stator winding lead wires 470, 472, 474 are not shown in FIG. 15 so that the mounting blocks may be seen more clearly.

Figure 16:
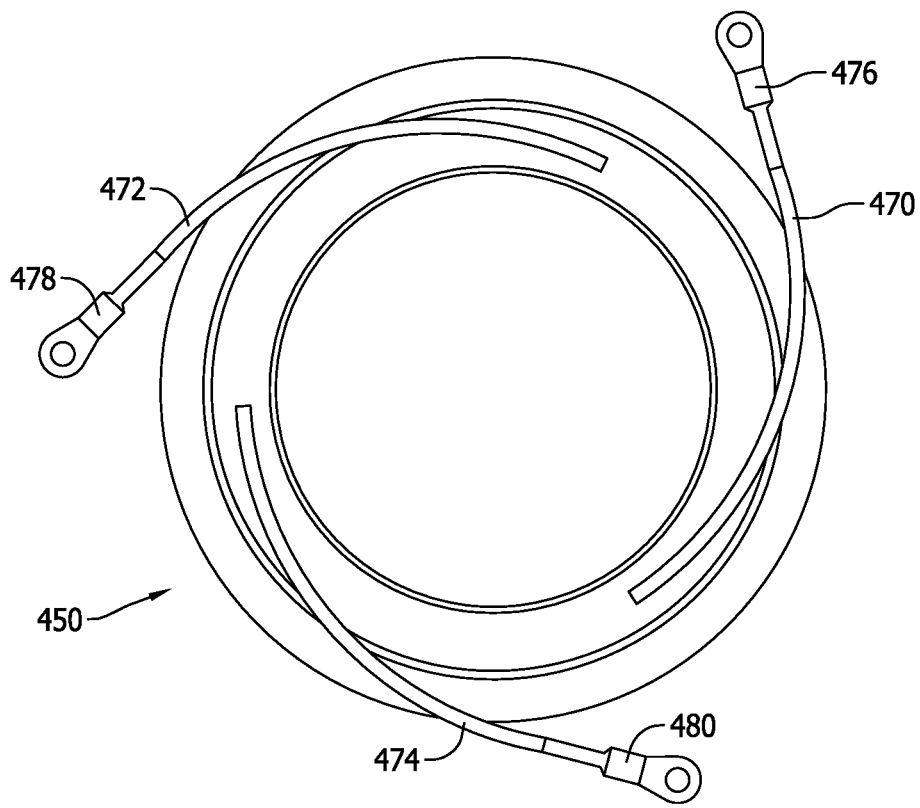
FIG. 16 is a second end view of the stator cooling jacket shown in FIG. 14.

FIG. 16 is a second end view of the stator cooling jacket 450 showing the stator winding lead wires 470, 472, 474 exiting the cooling jacket end at three different angular locations on the circumference of the cooling jacket end. Each distal end of the stator winding lead wires 470, 472, 474 is provided with the ring terminals 476, 478, 480 as shown. The mounting blocks are not shown in FIG. 16 so that the stator winding lead wires 470, 472, 474 may be seen more clearly.

Figure 17:
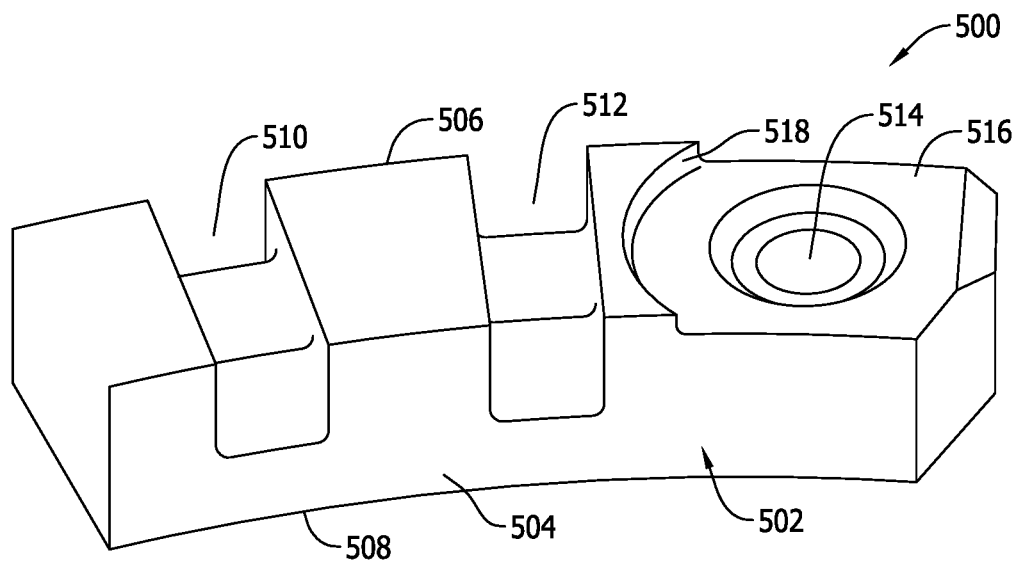
FIG. 17 is a perspective view of a first exemplary embodiment of a thermal limiter fuse mounting block for the stator cooling jacket shown in FIG. 14.

FIG. 17 is a perspective view of a first exemplary thermal limiter fuse mounting block 500 for the stator cooling jacket 450. The mounting block 500 includes a block body 502 having opposed curved sides of respectively different radius of curvature forming an arcuate profile of the block 500 for mounting on the circumference of the stator cooling jacket 450 as shown in FIG. 15. The curvature of the block 500 also generally matches the curvature of the stator windings inside the cooling jacket 450 in use.

The block body 502 further defines a generally flat bottom surface 508 that may be roughened to facilitate a secure epoxy bond to the circumference of the stator cooling jacket 450. Above the bottom surface 508 the block body 502 further defines a pair of lacing slots 510, 512 that respectively receive wrapping tape as a secondary retention feature to couple the block 500 to the stator cooling jacket 450.

One end of the block body 502 is formed with a mounting aperture 514 that may receive a terminal stud to complete a connection to a thermal limiter fuse 350. A terminal blade receiving surface 516 extends around the mounting aperture 514, and the receiving surface includes a face or ledge 518 constrains an orientation of the thermal limiter fuse 350 when mounted to the block 500. The face or ledge 518 in the example shown is seen to be uniformly rounded and may therefore accept the end 362 of the blade 354 (FIG. 9) of the thermal limiter fuse 350. The face or ledge 518 will not accept, however, the end 364 of the blade 356 (FIG. 9) that has the squared profile. The face or ledge 518 therefore ensures a one-way installation of a thermal limiter fuse to the block. The face or ledge 518 accepts or rejects the terminal blades to ensure proper installation of the thermal limiter fuse and current flow therethrough in only one direction. Of course, the arrangement described could be effectively reversed in that the face or ledge 518 may alternatively be configured to accept the end 364 of the blade 356 if desired. Various different shapes of the face or ledge 518 may be provided to accept or reject thermal limiter fuse terminals of still other shapes, and in some cases the face or ledge 518 may be considered optional and may be omitted.

Figure 18:
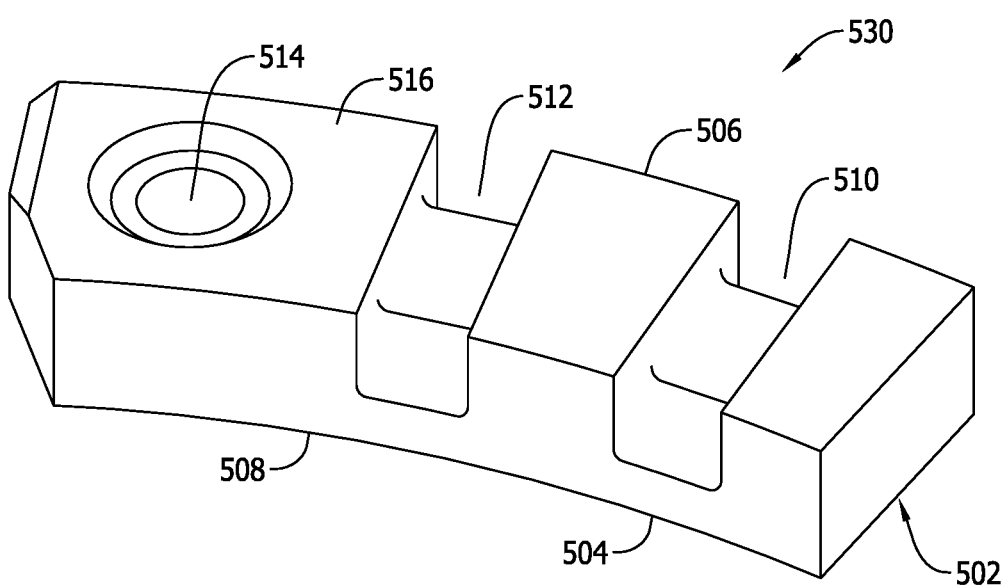
FIG. 18 is a perspective view of a second exemplary embodiment of thermal limiter fuse mounting block for the stator cooling jacket shown in FIG. 15.

FIG. 18 is a perspective view of a second exemplary thermal limiter fuse mounting block 530 for the stator cooling jacket 450. The mounting block is similar to the block 500 except that the mounting aperture 514 and lacing slots 510, 512 are reversed such that the mounting aperture 514 in the block 530 extends on an opposite end relative to the mounting block 500. Also, the face or ledge 518 proximate the mounting aperture 514 in the block 500 is omitted in the block 530 such that the block 530 does not restrict an orientation of the thermal limiter fuse 350 when connected to the block 530.

In contemplated embodiments, each pair of mounting blocks on the stator cooling jacket end includes one of the blocks 500 and one of the blocks 530 with the mounting apertures 514 in each block being spaced apart by a distance equal to the center-to-center spacing $L_2$ (FIG. 10) of the terminal blade apertures in the thermal limiter fuse 350. When terminal studs are provided in the mounting apertures 514 in each block, the block 500 accepts the rounded terminal blade of the thermal limiter fuse 350 and the block 530 accepts the square terminal blade of the thermal limiter fuse 350 in each pair. A stator winding lead wire is likewise connected to the rounded terminal blade of the thermal limiter fuse 350 via the ring terminals described and a power supply wire may also be connected to the square terminal blade of the thermal limiter fuse 350 with compatible ring terminals.

The mounting blocks 500 and 530 in contemplated embodiments may be conductive elements fabricated from copper or aluminum according to known techniques. The blocks 500, 530 may be mounted onto the end of the insulated stator coil windings as shown in the cooling jacket 450 which in a contemplated embodiment is made of cast metal and is not electrically connected to the stator. Various other materials and mounting arrangements are possible for the blocks 500, 530 and/or the cooling jacket 450 to facilitate installation and removal of the thermal limiter fuses described with otherwise similar benefits.

Fasteners such as nuts may secure the respective ring terminals of the power supply wires and the stator winding lead terminals to the blocks to provide thermal protection for each stator winding in the motor. The mounting blocks, terminal studs, and ring terminals provide quick and easy electrical connections and replacement of the thermal limiter fuses when needed. In this aspect, the difficulties of wire crimp connectors covered in heat shrink materials may be avoided from the perspective of fuse replacement, while the wire crimp connectors may provide cost savings by avoiding the costs of providing the stator mounting terminal blocks. Either way, thermal protection to avoid motor stalling and or fire hazards may be effectively mitigated in a relatively cost effective manner.

The benefits of the inventive concepts described herein are now believed to have been amply illustrated in relation to the exemplary embodiments disclosed.

An embodiment of a thermal limiter system for protecting an electric motor has been disclosed. The thermal limiter system includes at least one thermal limiter fuse having a housing having a first end and a second end opposing the first end. A first terminal is attached to the first end and a second terminal is attached to the second end. A thermal limiter assembly is connected between the first terminal and the second terminal, and the thermal limiter assembly includes a hollow contact element anchored by solder to at least one of the first terminal and the second terminal. The thermal limiter assembly also includes a coaxial spring element extending about the hollow contact element and causing the hollow contact element to slidably release and separate from one of the first and second terminals due to overheating of the solder that is not caused by a flow of electrical current.

Optionally, the thermal limiter assembly may also include an eyelet held stationary in the housing, and a retainer clip coupled to the hollow contact element, with the coaxial spring element acting on the eyelet on a first end thereof and acting on the retainer clip on a second end thereof. The first terminal may also include a guide rod portion extending internally to the housing, with a first end of the hollow contact element being soldered to the guide rod portion. The second terminal may include a guide opening receiving a second end of the hollow contact element, with the second end of the hollow contact element being soldered to the second terminal proximate the guide opening. The coaxial spring element may be a compression spring, and the solder may be formulated to melt at about 280° F.

As a further option, the first terminal may include a first guide rod portion extending internally to the housing, and the second terminal also includes a second guide rod portion extending internally to the housing, with the hollow contact element being received partly on the first guide rod portion and partly on the second guide rod portion. The hollow contact element may be soldered to each of the first and second guide rod portions. The hollow contact element may be filled with solder between the first and second guide rod portions. The hollow contact element may include a solder fill hole. The coaxial spring element may be a compression spring, and the solder may be formulated to melt at about 280° F.

The housing may optionally be cylindrical, and the first and second terminals may include one of a wire crimp terminal or a terminal blade. The first and second terminals may each be a terminal blade, and the terminal blade of the first terminal may have a first shape and the terminal blade of the second terminal may have a second shape distinct from the first shape.

The thermal limiter system may also include at least one stator mounting block, the at least one mounting block comprising a curved body generally matching a curvature of a stator winding. The curved body may include at least one lacing slot and a mounting aperture. The at least one mounting block may include a face accepting or rejecting one of the first or second terminals.

The thermal limiter system may also include a stator cooling jacket, with the at least one mounting block mounted to an end of the stator cooling jacket. One of the first and second terminals of the thermal limiter fuse may be mounted to the at least one mounting block. The stator cooling jacket may include first, second, and third stator lead wires extending from the end at respectively different locations. One of the first and second terminals of the thermal limiter fuse may be connected to one of the first, second and third stator lead wires. The at least one mounting block may include first, second and third pairs of mounting blocks spaced apart from one another on a periphery of the end of the stator cooling jacket.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal limiter system for protecting an electric motor, the thermal limiter system comprising:
   at least one thermal limiter fuse comprising:
      a housing having a first end and a second end opposing the first end;
      a first terminal attached to the first end, wherein the first terminal further comprises an exterior portion, a mounting collar, and a first guide rod portion, wherein the exterior portion, the mounting collar, and the first guide rod portion are distinct from each other, and wherein the exterior portion extends externally from the housing, and the mounting collar and the first guide rod portion extend internally to the housing;

a second terminal attached to the second end; and a thermal limiter assembly connected between the first terminal and the second terminal, the thermal limiter assembly including a hollow contact element anchored by solder to at least one of the first terminal and the second terminal, and a coaxial spring element at least partially surrounding the hollow contact element and causing the hollow contact element to slidably release and separate from one of the first and second terminals due to overheating of the solder that is not caused by a flow of electrical current, wherein an electrical current path between the first terminal and the second terminal is completed through the solder when the solder is in a hardened state, and the hollow contact element slides on the first guide rod portion when the solder is in a softened state.

2. The thermal limiter system of claim 1, wherein the thermal limiter assembly further comprises an eyelet held stationary in the housing, and a retainer clip coupled to the hollow contact element, and the coaxial spring element acting on the eyelet on a first end thereof and acting on the retainer clip on a second end thereof.

3. The thermal limiter system of claim 2, wherein a first end of the hollow contact element being soldered to the first guide rod portion.

4. The thermal limiter system of claim 3, wherein the second terminal comprises a guide opening receiving a second end of the hollow contact element, and the second end of the hollow contact element being soldered to the second terminal proximate the guide opening.

5. The thermal limiter system of claim 1, wherein the second terminal comprises a second guide rod portion extending internally to the housing, the hollow contact element being received partly on the first guide rod portion and partly on the second guide rod portion.

6. The thermal limiter system of claim 5, wherein the hollow contact element is soldered to each of the first and second guide rod portions.

7. The thermal limiter system of claim 6, wherein the hollow contact element is filled with solder between the first and second guide rod portions.

8. The thermal limiter system of claim 7, wherein the hollow contact element includes a solder fill hole.

9. The thermal limiter system of claim 1, wherein the housing is cylindrical.

10. The thermal limiter system of claim 9, wherein the first and second terminals comprises one of a wire crimp terminal or a terminal blade.

11. The thermal limiter system of claim 9, wherein the first and second terminal each comprises a terminal blade, the terminal blade of the first terminal having a first shape and the terminal blade of the second terminal having a second shape distinct from the first shape.

12. The thermal limiter system of claim 1, wherein the coaxial spring element is a compression spring.

13. The thermal limiter system of claim 1, further comprising at least one mounting block, the at least one mounting block comprising a curved body generally matching a curvature of a stator winding.

14. The thermal limiter system of claim 13, wherein the curved body includes at least one lacing slot and a mounting aperture.

15. The thermal limiter system of claim 13, further comprising a stator cooling jacket, the at least one mounting block mounted to an end of the stator cooling jacket.

16. The thermal limiter system of claim 15, wherein one of the first and second terminals is mounted to the at least one mounting block.

17. The thermal limiter system of claim 15, wherein the stator cooling jacket includes first, second, and third stator lead wires extending from the end at respectively different locations; and wherein one of the first and second terminals is connected to one of the first, second and third stator lead wires.

18. The thermal limiter system of claim 17, wherein the at least one mounting block includes first, second and third pairs of mounting blocks spaced apart from one another on a periphery of the end of the stator cooling jacket.

19. The thermal limiter system of claim 13, wherein the at least one mounting block includes a face accepting or rejecting one of the first or second terminals.

20. The thermal limiter system of claim 1, wherein the solder is formulated to melt at about 280° F.

* * * * *